United States Patent [19]

Gumbert

[11] Patent Number: 5,354,531
[45] Date of Patent: Oct. 11, 1994

[54] METHOD FOR PRODUCING FUNCTIONAL PARTS ON A LOAD-BEARING PLATE OF AN ELECTROMECHANICAL DEVICE

[76] Inventor: Hans Gumbert, Ballersbacher Weg 30, 6349 Sinn/Dillk, Fed. Rep. of Germany

[21] Appl. No.: 895,573

[22] Filed: Jun. 8, 1992

Related U.S. Application Data

[60] Division of Ser. No. 573,430, Aug. 23, 1990, abandoned, which is a continuation-in-part of Ser. No. 507,947, Apr. 16, 1990, abandoned.

[30] Foreign Application Priority Data

Apr. 11, 1989 [DE] Fed. Rep. of Germany ....... 3911746

[51] Int. Cl.$^5$ .................. B29C 53/02; B29C 53/84
[52] U.S. Cl. .................... 264/242; 264/296; 264/320; 264/322
[58] Field of Search ........... 360/96.5, 137; 264/242, 264/273, 275, 274, 293, 296, 320, 322

[56] References Cited

U.S. PATENT DOCUMENTS

| | | | |
|---|---|---|---|
| 3,214,504 | 10/1965 | Gemberling | 264/242 |
| 3,840,065 | 10/1974 | Hannes | 264/242 |
| 4,158,450 | 6/1979 | Suzuki | 264/242 |
| 4,796,120 | 1/1989 | Komatsu et al. | 360/96.5 |

FOREIGN PATENT DOCUMENTS

| | | |
|---|---|---|
| 1055892 | 4/1959 | Fed. Rep. of Germany . |
| 57-19713 | 12/1982 | Japan . |

*Primary Examiner*—Jan H. Silbaugh
*Assistant Examiner*—A. Y. Ortiz

[57] ABSTRACT

An electromechanical device for moving magnetic tapes or disks has a metal load-bearing plate provided with openings and injection molded plastic control rods and shafts held in phase by injection molded plastic retention pieces connected through the openings. These retention pieces are provided with a greater clearance relative to the metal load-bearing plate than that achieved by injection molding by a deformation blow to the plastic control rods and shafts after molding.

10 Claims, 4 Drawing Sheets

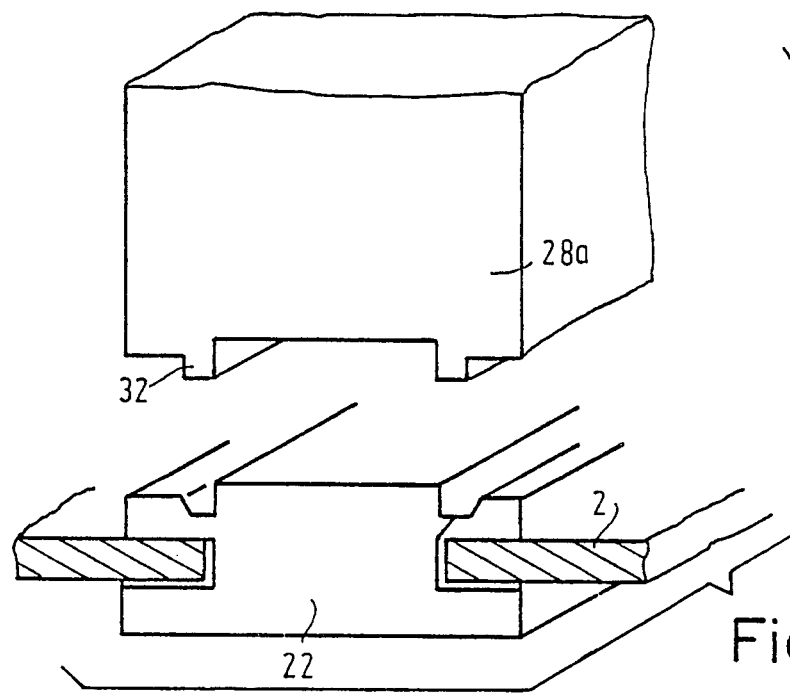
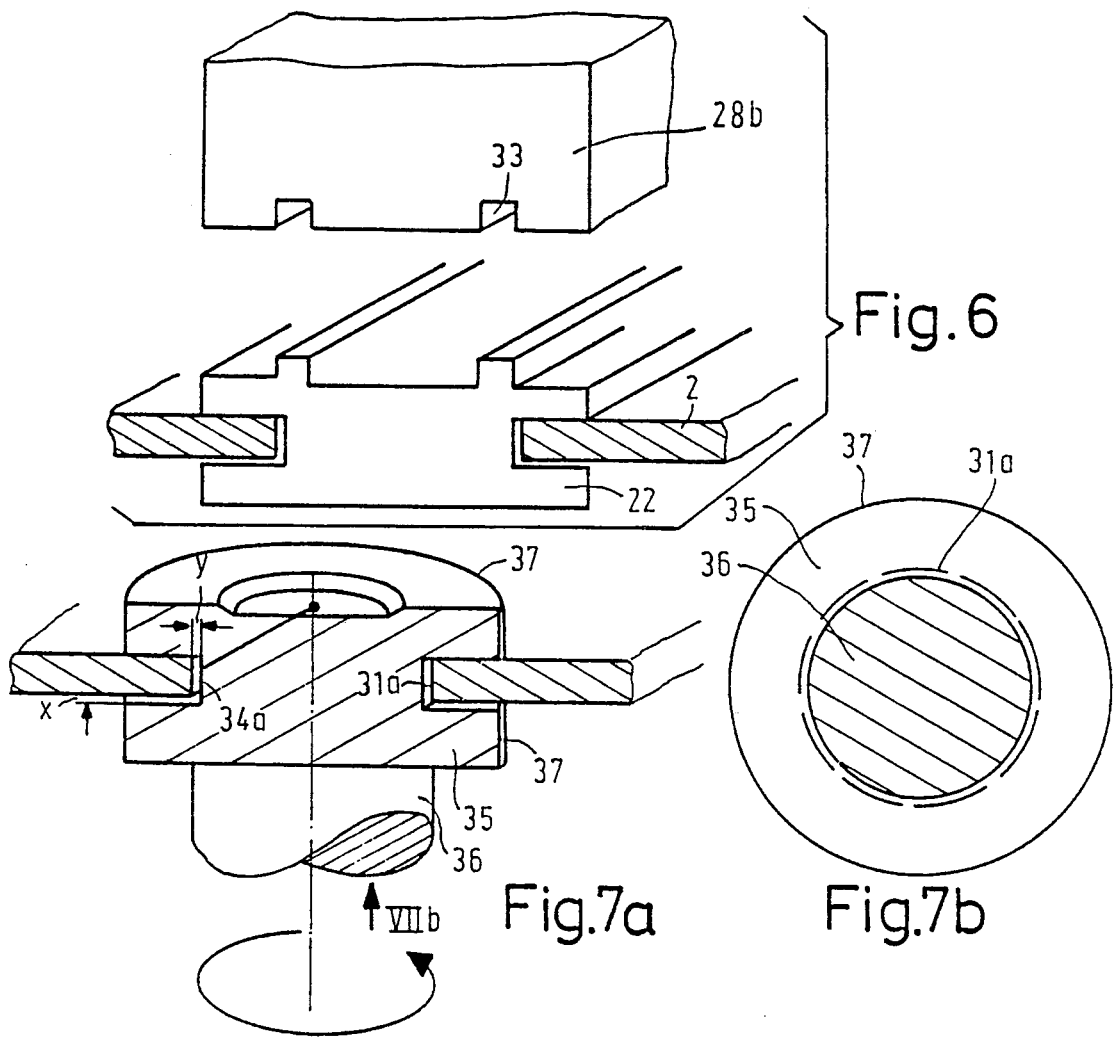

METHOD FOR PRODUCING FUNCTIONAL PARTS ON A LOAD-BEARING PLATE OF AN ELECTROMECHANICAL DEVICE

This is a division of application Ser. No. 573,430, filed Aug. 23, 1990, now abandoned, which is a continuation in part of Ser. No. 07/507,947, filed Apr. 16, 1990, now abandoned.

BACKGROUND OF THE INVENTION

The invention relates to an apparatus, in particular an electromechanical device for moving information carriers, such as magnetic tapes or disks, such a device has a load-bearing plate of metal, on which are formed by plastics injection-molding (outsert moulding) plastic functional parts, each of which are held in the region of at least one plate opening by means of plastic retention pieces on both plate surfaces, which are connected through the opening means plastic bridge-formed integrally with them. The invention also relates to a method for producing a functional part that is mobile relative to the load-bearing plate.

Devices in which load-bearing metal plates are provided with molded-on plastic parts are known. The production technique for such load-bearing plates is known by the name outsert molding. The functional parts formed on the load-bearing plate serve a very wide variety of purposes, such as the retention, mounting or guidance of additional functional parts. The joining technique between the molded-on functional parts and the load-bearing plate always consists in plastic retention pieces being molded onto the upper side and the lower side of the plate in the region of openings in the plate, these retention pieces overlapping the edges of the opening, and the two plastic retention pieces being connected via a plastic bridge extending through the opening.

In this design of load-bearing plates, it is also known to form molded-on plastic parts which are rotatable about the plastic bridge. However, the extent of this rotatability is not so great that it is comparable to a mobile mounting of a bearing.

SUMMARY OF THE INVENTION

It is an object of the invention to provide an apparatus of the type described provided with a metal load-bearing plate formed by injection (outsert) molding and having molded on functional parts in which the molded parts, holding the functional parts to the metallic load-bearing plate, are so constructed so as to provide a mobility to the functional parts, relative to the metallic load-bearing plate, that corresponds to that of a sliding bearing.

In this way, it is possible to economize on the formation of sliding bearing, which would otherwise be formed between the functional part and an additional component. This economy leads to a reduction in the overall height, this being of great importance particularly in the case of drive mechanisms for car radios.

There are two preferred possibilities for the formation of such sliding bearings, on the one hand the formation of a rotary sliding bearing and, on the other hand, the formation of a slide bearing. To form a slide bearing, provision is made according to a further embodiment of the invention for the opening to have the form of a longitudinal slot and for the plastic retention pieces and the connecting plastic bridge to cover only part of the length of the longitudinal slot. The functional part can thus be displaced along the longitudinal slot.

To form a rotary bearing, provision is made according to a still further embodiment of the invention that the opening has the form of a hole with a circular hole edge, the plastic bridge connecting the plastic retention pieces forms a shaft.

According to an additional embodiment of the invention, provision is made so that only the plastic retention piece provided on one side face of the load-bearing metal plate is continuous from one edge of the opening to the other edge of the opening while overlapping said edges, the bridge extending through the opening is divided into part-bridges adjacent to the edges of the opening, which part-bridges are joined on the other side face of the load-bearing metal plate by the plastic retention pieces overlapping the edges of the opening, thereby forming clasp hooks.

This gives rise to a more marked clasping effect.

According to a further embodiment of the invention, provision is made that grooves are provided in the part-bridges, provision being made in further developments of this embodiment that the grooves run parallel to the plane of the plate. Clearance adjustment within very wide limits is thereby possible.

According to a further embodiment of the invention, the clearance leading to a sliding bearing, which clearance is greater than the shrinkage clearance obtained after the injection-molding operation, is achieved with the aid of a method which is characterized in that after molding the plastic injection molding the molding is subjected to a deformation blow, as a result of which blow the overlapping plastic retention parts come away from the overlapped parts of the plate. This deformation blow can be applied at various times, either while the mold is still in the injection mold, before removal from the mold, or outside the injection mold, immediately after removal from the mold. It is furthermore possible to apply the deformation blow after renewed heating up or, depending on the properties of the injection-molding material, even while the workpiece is cold.

According to a further embodiment of the invention, a shaping ram, which is pressed against the functional part while the plate around one of the plastic retention pieces associated with it rests on a counter-abutment, is provided for applying the deformation blow. In a further development of the device, the shaping ram can here be shaped in such a way that it can be pressed against the functional part only within the region of the plastic bridge. The shaping ram can likewise have embossing ribs, which can be pressed against the functional part in the region of the edges of the opening.

The invention is explained in greater detail with reference to the drawing, in which:

BRIEF DESCRIPTION OF THE DRAWINGS

In the drawing

FIGS. 5 and 6 show two other deformation configurations of a functional part, with shaping rams embossing grooves or ribs;

FIG. 7a shows a sliding bearing for a shaft mounting in section, said bearing having been obtained with the aid of a round shaping ram;

FIG. 7b shows the shaft mounting according to FIG. 7a in plan view in the direction of the arrow VIIb;

DETAILED DESCRIPTION OF THE INVENTION

Figure 1:
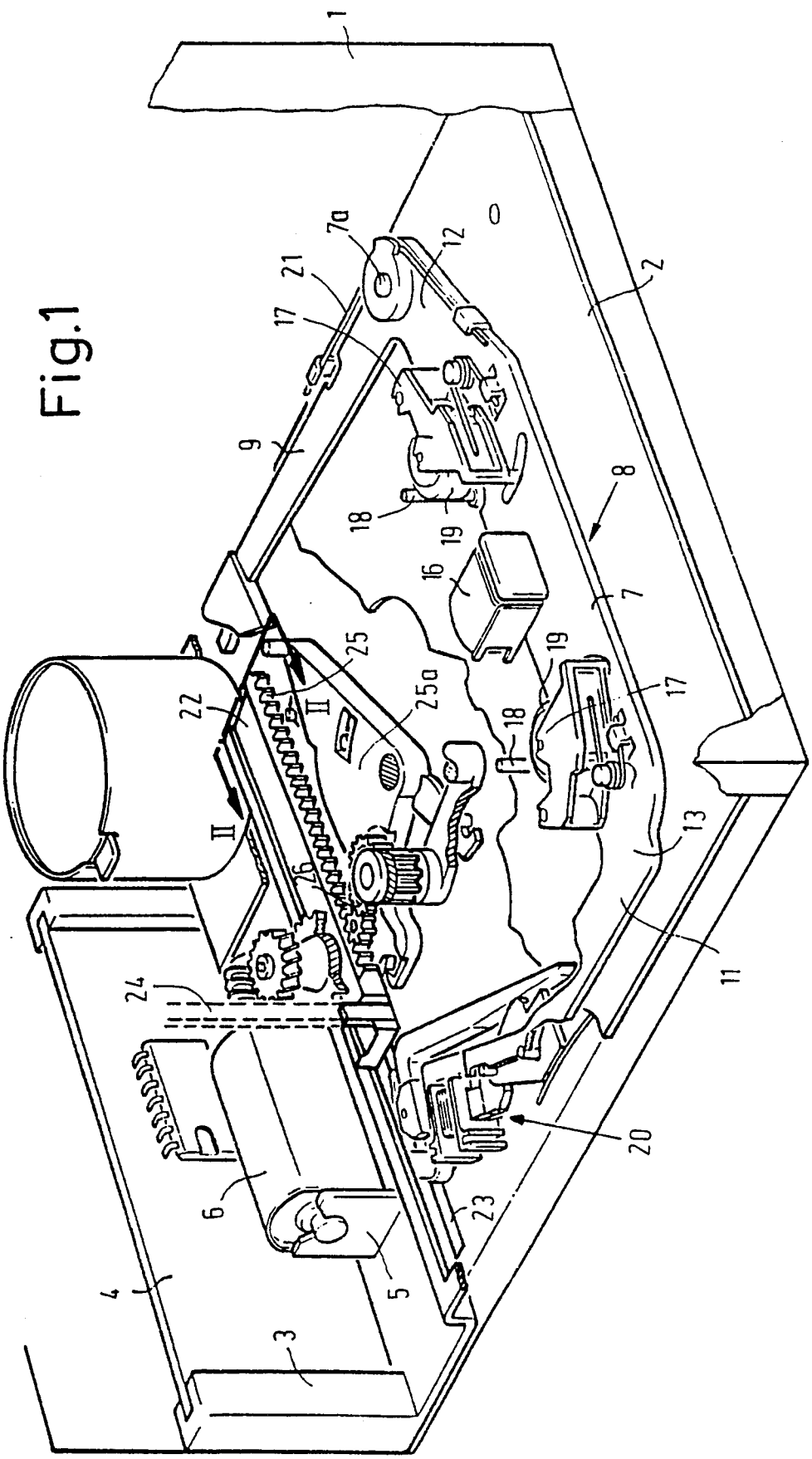
FIG. 1 is an isometric view of a drive mechanism for moving information carriers in tape from in a car radio.

FIG. 1 shows, in an apparatus, for example a car radio, the base plate 2 of a magnetic tape cassette drive mechanism, to which functional parts 3, for example for supporting a circuit board 4 and 5 and for mounting a motor 6 are molded by outsert molding. A head plate 8, on which the legs 9 and 11 act in corner regions 12 and 13, can be pivoted about a bearing pin 7a, likewise molded on. The basic part 7 of the head plate carries a magnetic head 16 and, via mounts 17, pressure rollers 19 co-operating with capstans 18. A holding-electromagnet device 20 is provided on leg 11, by means of which device the head plate 8 can be held in a manner not described in greater detail in a play or cue position, counter to the action of a spring 21. The head plate 8 can also be produced by outsert molding.

A control rod 22, which can be displaced along a slot 23 by a cassette draw-in mechanism (not shown), is provided. Displacement is accomplished with the aid of a coupling member 24 illustrated partially by dashed lines.

The control rod 22 is provided with a toothing 25 which acts via a gear mechanism 26 on a switching device 25a for controlling the various drive mechanism functions.

Figure 2:
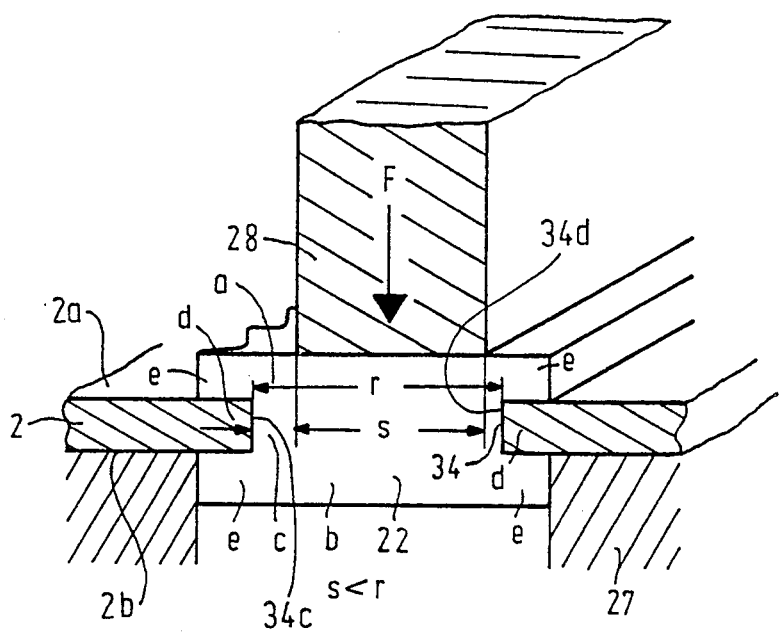
FIG. 2 shows a section through a cut-away portion of the base plate of the drive mechanism with a functional part molded on, arranged schematically between a shaping ram and a counter-abutment.
Figure 3:
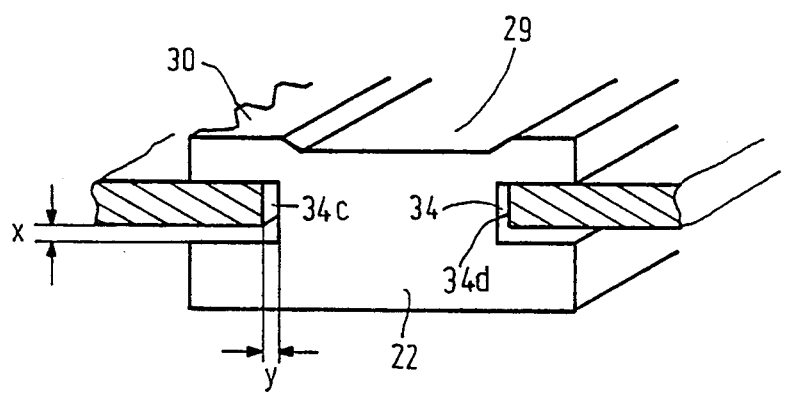
FIG. 3 shows the section according to FIG. 2 after a deformation blow has been carried out, the artificial clearance obtained in this procedure being visible.

The control rod 22 is molded directly onto the metallic base plate by outsert molding. A simplified representation of the control rod 22 after it has been molded onto the base plate 2 is given in FIG. 2 by means of a section II—II in accordance with FIG. 1. In the representation according to FIG. 2 the region of the base plate 2 around the control rod 22 rests on the upper side of a counter-abutment 27. A shaping ram 28 is placed on the control rod 22. If the shaping ram 28 is struck briefly against the control rod 22 in the direction of an arrow F, the control rod deforms into the shape which can be seen from FIG. 3. Due to a slight indentation 29 on the upper side 30 of the control rod, both a clearance x parallel to the plane of the base plate 2 and a clearance y perpendicular to the base plate 2 has formed in the region of the molding around the base plate edges 31. The control rod 22 is thus held on the base plate 2 with a larger clearance than would have been the case due to any material shrinkage after the molding operation, without deformation. This clearance x/y leads to a type of sliding mounting of the control rod 22 on the base plate 2.

Figure 4:
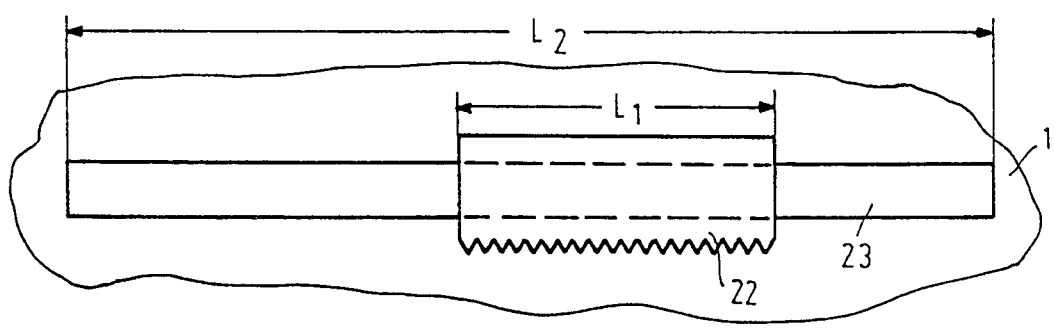
FIG. 4 shows the functional part according to FIGS. 1 to 3, designed as slide, in top plan view onto the base plate, which plate has a relatively long slot on which the functional part can be displaced in the form of a slide.

From FIG. 4 which only shows the longitudinal slot 23 and the control rod 22 according to FIG. 1, it can be seen that the axial length $L_1$ of the control rod 22 is considerably shorter than that of the longitudinal slot 23, which is indicated by $L_2$. By the introduction of the controlled clearance between the base plate 2 and the control rod 22, the rod 22 can be displaced easily on the base plate 2 along the longitudinal slot 23.

FIGS. 5 and 6 show variants of the shaping ram design with shaping rams 28a and 28b. Shaping ram 28a has projecting strips 32 and shaping ram 28b has indented grooves 33. The arrangement of the grooves 33 or the strips 32 makes it possible to obtain particular desired deformation conditions in the region of the edges 31 of the openings 34 in the base plate 2.

FIGS. 7a and 7b show a modification of the design of the sliding bearing, the opening 34a having a circular plate edge 31a. After deformation, gaps xy, which serve the purpose of displacement clearance and by means of which, for example, a shaft 36 in a bearing element 35 can be mounted, again result. The outer periphery 37 of the mounting 35 can be seen from FIG. 7b. The edge 31a of the opening is represented in dashed lines in FIG. 7b and the sectioned shaft 36 is represented centrally in FIG. 7b.

The figures shown relate to the formation of mobile parts on a base plate by outsert molding. Of course, the metallic plate need not be a base plate; it can likewise be another functional plate within the apparatus, it too again being formed by outsert molding. The head plate 8 of the drive mechanism may be mentioned as an example.

In the case of constructions employing outsert molding, the procedure is always such that the functional part molded onto the plate, whether it be the control rod 22, the shaft 36 or any other desired molded-on part, is provided with two plastic retention pieces a and b which are connected to one another via a plastic bridge c which reaches through the opening 34. In this arrangement, there are plate parts d overlapped by the plastic retention pieces a and retention-piece parts e overlapping the plate parts d. After being molded on, the plastic of the retention pieces a, b and of the plastic bridge c shrinks in such a way that the connection to the plate is not completely rigid. However, the shrinking process is not sufficient to bring about mobility similar to that of a sliding bearing.

The deformation blow performed by the shaping rams 28, 28a and 28b can be performed in the injection mold even before the removal of the functional part from the mold. It is likewise possible to perform the deformation blow immediately after removal from the mold. A further possibility consists in heating up the functional part subsequently once again and then applying the deformation blow in the heated-up condition. Depending on the properties of the material, however, the deformation blow can also be applied while the workpiece is cold. In each case, it is only the deformation blow which leads to a proper formation of a sliding bearing, in which the amount of clearance created between the plate and the functional part is such that the desired rotary mobility or ease of movement is created.

Figure 8:
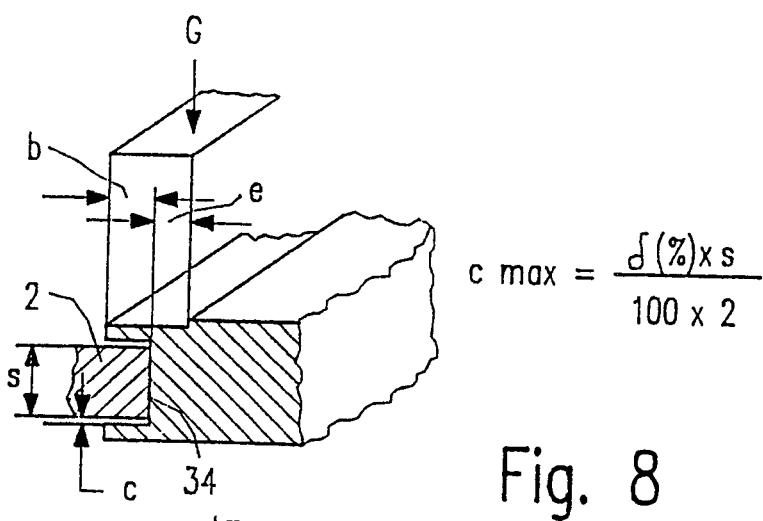
FIG. 8 shows a representation of the permanent deformation after a deformation operation with excess width.

FIG. 8 shows the extent of compression when the pressure surface G is extended beyond the edge 34 of the opening of the metal base plate 2. A fibre displacement takes place in the plastic material of the functional part. The shrinkage can be stated using the equation:

$$C_{max} = \frac{\delta\% \cdot s}{100 \cdot 2}$$

C being the achievable clearance, taking into account spring-back, δ being the extensibility of the plastic material and s being the material thickness of the metal material.

Figure 9:
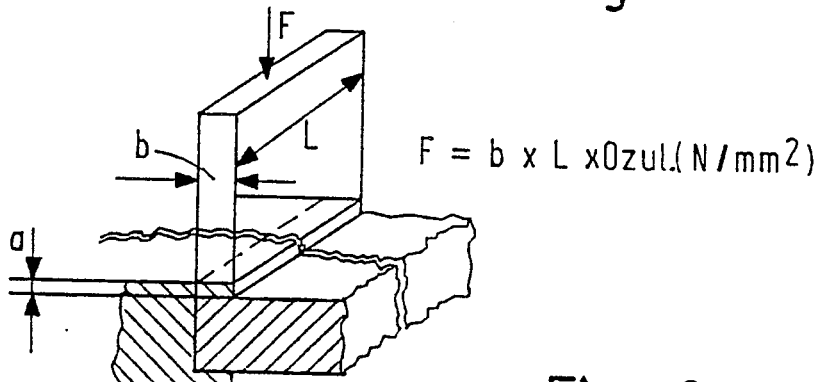
FIG. 9 shows a representation of the pressure conditions to achieve the deformation.

FIG. 9 illustrates the deformation conditions before the application of pressure when the edge 34 of the opening is simultaneously also the pressure edge 41. The conditions can be stated by:

$$F = b \times l \times Q_{permiss.} \; (N/mm^2)$$

F being the pressure, b the longitudinal extension of the plastic material, l the length of the pressure zone and Q the permissible compressive strength of the plastic material. The pressure required for pressing free or knocking free here depends on the size of the area b·l. When pressure is employed, a decrease in the height a according to FIG. 9 occurs.

Figure 10:
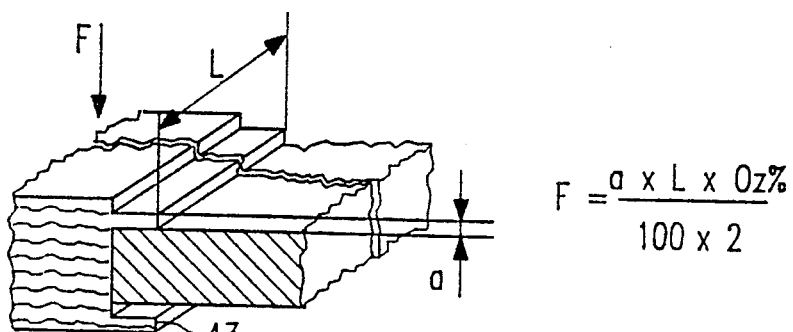
FIG. 10 shows the geometrical conditions after a deformation operation with overlap width.

FIG. 10 shows the result of employing pressure according to FIG. 9. The height a' is reduced compared with the height a according to FIG. 9. During the deformation, a displacement or extension of the plastic towards the edge 43 occurs.

Figure 11:
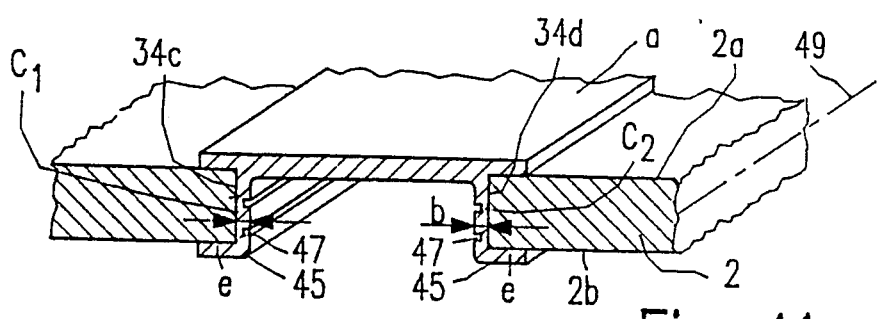
FIG. 11 shows a modified embodiment with a divided through-bridge.

In the embodiment according to FIG. 11, the plate 2 is clasped by clasp hooks 45. The clasp hooks 45 comprise part-bridges $c_1$, $c_2$, which are adjoined by plastic retention pieces e overlapping the edges 34c, 34d of the opening. Grooves 47, which run parallel to the plane of the plate, are provided in the part-bridges $c_1$, $c_2$.

If a blow is exerted on the plastic retention piece a, the part-bridges $c_1$, $c_2$ bend towards one another with their free ends and the control rod 22 becomes displaceable relative to the plate 2. The extent of the clearance on the plate 2 achieved by the blow can be markedly influenced by the power of the blow and the grooving.

The temperature at the time of the blow can fluctuate by 20° C. within the injection mold and after the injection operation. Outside the injection mold, the temperature may have fallen by up to 100° C. relative to the temperature in the injection mold no more than 5 minutes after the injection operation.

The temperature is dependent on the material employed and the carrier material used, e.g. steel, aluminum or plastic.

The clearance to be expected is to be viewed within the limits of the extension of the material used and can be chosen with a certain tolerance (spring-back).

Even if creep effects cannot be observed, reformations immediately after deformation must be expected. This should be taken into account in the operation. The required clearance can be adjusted as desired by the power of the deformation blow. Thermoplastics, the elasticity of which withstands a contraction stress without loss of strength and permits extension after the shrinkage process are used, such as POM (polyoxymethylene/polyacetal), ABS (acrylonitrile-butadiene-styrene (copolymer)), PA polyamide.

The necessary clearance can be adjusted as desired by the power of the deformation blow.

I claim:

1. In the method of manufacturing an electromechanical device, by forming by injection molding plastic control rod (22) and plastic shaft (36) on a metal load-bearing plate (2) provided with at least one plate opening (34), plastic retention pieces (a,b) on both surfaces of said plate (2) having overlapping parts (e) overlapping edges (d) of said opening (34) and a plastic bridge (c) formed integrally with said retention pieces (a,b) and connecting said pieces (a,b) through said opening (34) in a manner such that said control rod (22) and said shaft (36) are held in the region of at least one plate opening (34) by means of said plastic retention pieces (a,b) and said control rod (22) and shaft (36) are capable of moving relative to said plate (2), the improvement wherein, after said injection molding, said control rod (22) and said shaft (36) are subjected to a deformation action to thereby cause said control rod (22) and said shaft (36) to be so deformed that overlapping plastic parts (e) of said plastic retention pieces (a, b) are moved away from overlapped edges (d) of said opening so that sufficient clearance is obtained of the overlapping parts (e) with respect to the overlapped edges (d) so that the mobility of said control rod (22) and said shaft (36) with respect to said plate (2) corresponds to that of a sliding bearing.

2. Method according to claim 1, characterized in that the deformation action is performed while the molding is still in the injection mold, before removal from the mold.

3. Method according to claim 1 characterized in that the deformation action on said control rod (22) and said shaft (36) is performed immediately after removing said device from the mold.

4. Method according to claim 1 characterized in that the deformation action on said control rod (22) and said shaft (36) is performed after renewed heating up of said device.

5. Method according to claim 1 characterized in that the deformation action is performed while the molding is cold.

6. Method according to claim 1, wherein the shaping ram (28) is dimensioned in such a way that it can be pressed against the plastic rod means only within the region of the plastic bridge.

7. Method according to claim 1, wherein the shaping ram (28a) has embossing strips which can be pressed against the plastic rod means (22) in the region of the edges (d) of the opening.

8. Method according to claim 1, wherein the shaping ram (28b) has embossing grooves (33) which can be pressed against the plastic rod means (22) in the region of the edges (d) of the opening.

9. The method of claim 1 wherein the deformation action is a deformation blow.

10. The method of claim 9 wherein a shaping ram (28, 28a, 28b) is pressed against the plastic control rod (22) and the plastic shaft (36) while the plate around one of the plastic retention pieces (a, b) associated with the plastic control rod (22) and plastic shaft (36) rests on a counter-abutment (27).

* * * * *